(12) United States Patent
Iwasaki et al.

(10) Patent No.: US 6,249,741 B1
(45) Date of Patent: Jun. 19, 2001

(54) APPARATUS FOR SUPPORTING THE PREPARATION OF TRAVEL ROUTES

(75) Inventors: Eiichi Iwasaki; Shin Takamatsu, both of Nagoya (JP)

(73) Assignee: Central Japan Railway Company, Nagoya (JP)

( * ) Notice: Subject to any disclaimer, the term of this patent is extended or adjusted under 35 U.S.C. 154(b) by 0 days.

(21) Appl. No.: 09/367,807

(22) PCT Filed: Aug. 31, 1998

(86) PCT No.: PCT/JP98/03909

§ 371 Date: Aug. 19, 1999

§ 102(e) Date: Aug. 19, 1999

(87) PCT Pub. No.: WO00/12369

PCT Pub. Date: Mar. 9, 2000

(51) Int. Cl.$^7$ .................................................. G01C 21/00
(52) U.S. Cl. .................................... 701/202; 340/994
(58) Field of Search ................................ 701/202, 209, 701/200, 201, 207, 208, 210, 211, 213, 217; 340/994, 990, 995; 705/5, 6

(56) References Cited

U.S. PATENT DOCUMENTS

| | | | |
|---|---|---|---|
| 5,107,433 | * 4/1992 | Helldorfer et al. | 340/995 |
| 5,675,492 | * 10/1997 | Tsuyuki | 701/202 |
| 5,884,291 | * 3/1999 | Poppen | 701/202 |
| 6,163,748 | * 12/2000 | Guenther | 701/202 |

FOREIGN PATENT DOCUMENTS

| | | | |
|---|---|---|---|
| 2079453 | * 1/1982 | (GB) | 701/202 |
| 5-298593 | 11/1993 | (JP) . | |
| 6-101004 B2 | 12/1994 | (JP) . | |
| 9-282372 | 10/1997 | (JP) . | |

OTHER PUBLICATIONS

A Collection of Theses from a Domestic Symposium on Use of Cybernetics in Railroads, vol. 29 (Nov. 16, 1992) Kenji Kataoka et al. Development of System for Supporting Crew Operation Schedule Preparation, pp. 202–206.

A Collection of Theses from a Domestic Symposium on Use of Cybernetics in Railroads, vol. 30 (Nov. 5, 1993) Toshiko Kadono et al., "Development of Crew Operation Planning Support System", pp. 256–259.

A Collection of Theses from a Domestic Symposium on Use of Cybernetics in Railroads, vol. 34 (Nov. 5, 1997) Eiichi Iwasaki et al., "Development of Crew Operation Automatic Preparation Feature", pp. 116–119.

* cited by examiner

Primary Examiner—Richard M. Camby
(74) Attorney, Agent, or Firm—Davis & Bujold, P.L.L.C.

(57) ABSTRACT

A machine for assisting crew itinerary production is proposed which alleviates the burden of operator's works and produces practical crew rosters in a short period of time. At first, old crew roster data are copied as they are as new crew roster data in the middle of production. Subsequently, among new train IDs corresponding to boarding section data constituting new itinerary data, the data which exist as new train IDs corresponding to new rolling stock operation data are adopted as they are, and the data which do not exist as new train IDs corresponding to new rolling stock operation data are eliminated, suspensions of the service being made to correspond to the data. The same processings are executed for all new itineraries. The train IDs which have not been allotted among new train IDs corresponding to new rolling stock operation data are classified into the unallotted group. Then, new train IDs within the allowable range of departure/arrival information of boarding sections of suspension of the service are selected from the train IDs classified into the unallotted group among new train IDs corresponding to new rolling stock operation data and adopted as the new train IDs corresponding to the boarding section data.

8 Claims, 14 Drawing Sheets

F I G. 1
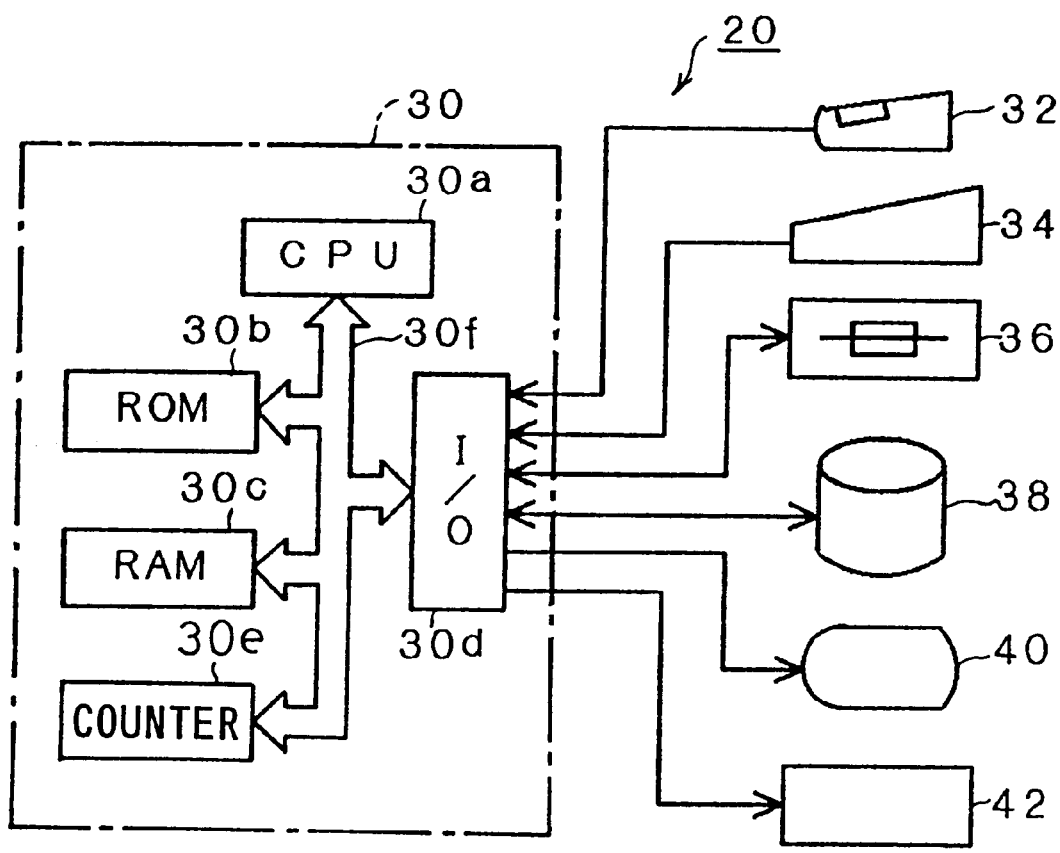

(a) OLD TRAIN DATA

| OLD TRAIN ID | DEPARTURE STATION (DEPARTURE TIME) | ARRIVAL STATION (ARRIVAL TIME) |
|---|---|---|
| 001 | A (12:00) | C (12:50) |
| 002 | A (12:30) | C (13:20) |
| ⋮ | ⋮ | ⋮ |
| 011 | C (13:00) | A (13:50) |
| 012 | C (13:30) | A (14:20) |
| ⋮ | ⋮ | ⋮ |

(b) OLD TRAIN DIAGRAM

* THE NUMBER IN THE BOX SHOWS A TRAIN ID (a) OLD ROLLING STOCK OPERATION DATA

| OLD TRAIN NO. | DRIVING SECTION DEPARTURE ARRIVAL | OLD TRAIN ID |
|---|---|---|
| 1 | A — C<br>12:00  12:50 | 0 0 1 |
|   | C — A<br>13:00  13:50 | 0 1 1 |
| 2 | A — C<br>12:30  13:20 | 0 0 2 |
|   | C — A<br>13:30  14:20 | 0 1 2 |

(b) OLD CREW ROSTER DATA

| OLD ITINERARY NO. | BOARDING SECTION DEPARTURE ARRIVAL | OLD TRAIN ID |
|---|---|---|
| 1 | A — C<br>12:00  12:50 | 0 0 1 |
|   | C — A<br>13:30  14:20 | 0 1 2 |

(c) OLD ROLLING STOCK OPERATION DIAGRAM AND OLD CREW ROSTER DIAGRAM

* THE NUMBER IN THE BOX SHOWS A TRAIN ID

(a) NEW TRAIN DATA

| NEW TRAIN ID | DEPARTURE STATION (DEPARTURE TIME) | ARRIVAL STATION (ARRIVAL TIME) |
|---|---|---|
| 0 0 1 | A (12:00) | C (12:50) |
| 0 0 2 | A (12:30) | C (13:20) |
| 0 0 3 | A (13:00) | C (13:50) |
| ⋮ | ⋮ | ⋮ |
| 0 1 1 | C (13:00) | A (13:50) |
| 1 1 2 | C (13:40) | A (14:30) |
|  |  |  |

(b) NEW TRAIN DIAGRAM

* THE NUMBER IN THE BOX SHOWS A TRAIN ID (a) NEW ROLLING STOCK OPERATION DATA

| NEW ROLLING STOCKS NO. | DRIVING SECTION DEPARTURE ARRIVAL | NEW TRAIN ID |
|---|---|---|
| 1 | A — C<br>12:00    12:50 | 0 0 1 |
|   | C — A<br>13:00    13:50 | 0 1 1 |
| 2 | A — C<br>12:30    13:20 | 0 0 2 |
|   | C — A<br>13:40    14:30 | 1 1 2 |
| 3 | A — C<br>13:00    13:50 | 1 0 3 |
|   | ... | .. |

(b) NEW ROLLING STOCK OPERATION DIAGRAM

* THE NUMBER IN THE BOX SHOWS A TRAIN ID

F I G. 9 (A)

DATA IN THE MIDDLE OF PRODUCTION

| NEW ITINERARY NO. | BOARDING SECTION DEPARTURE ARRIVAL | | NEW TRAIN ID |
|---|---|---|---|
| 1 | A — 12:00 | C 12:50 | 001 |
| | C — 13:30 | A 14:20 | 012 |

COPY

OLD CREW ROSTER DATA

| OLD ITINERARY NO. | BOARDING SECTION DEPARTURE ARRIVAL | | OLD TRAIN ID |
|---|---|---|---|
| 1 | A — 12:00 | C 12:50 | 001 |
| | C — 13:30 | A 14:20 | 012 |

FIG. 9 (B)

NEW CREW ROSTER DATA IN THE MIDDLE OF PRODUCTION AFTER S100–S190 HAVE BEEN FINISHED

| NEW ITINERARY NO. | BOARDING SECTION DEPARTURE ARRIVAL | NEW TRAIN ID |
|---|---|---|
| 1 | A — C<br>12:00   12:50 | 001 |
|   | C — A<br>13:30   14:20 | SUSPENSION OF THE SERVICE |

NEW ROLLING STOCK OPERATION DATA

| NEW ROLLING STOCKS NO. | DRIVING SECTION DEPARTURE ARRIVAL | NEW TRAIN ID | CLASSIFICATION |
|---|---|---|---|
| 1 | A — C<br>12:00   12:50 | 001 | ALLOTTED |
|   | C — A<br>13:00   13:50 | 011 | ALLOTTED |
| 2 | A — C<br>12:30   13:20 | 002 | ALLOTTED |
|   | C — A<br>13:40   14:30 | 112 | UNALLOTTED |
| 3 | A — C<br>13:00   13:50 | 103 | UNALLOTTED |
|   | ⋮ | ⋮ | ⋮ |

FIG. 9 (C)

NEW CREW ROSTER DATA IN THE MIDDLE OF PRODUCTION AFTER S200-S280 HAVE BEEN FINISHED

| NEW ITINERARY NO. | BOARDING SECTION DEPARTURE ARRIVAL | NEW TRAIN ID |
|---|---|---|
| 1 | A — C<br>12:00   12:50 | 001 |
|   | C — A<br>13:40   14:30 | 112 |

NEW ROLLING STOCK OPERATION DATA

| NEW ROLLING STOCKS NO. | DRIVING SECTION DEPARTURE ARRIVAL | NEW TRAIN ID | CLASSIFICATION |
|---|---|---|---|
| 1 | A — C<br>12:00   12:50 | 001 | ALLOTTED |
|   | C — A<br>13:00   13:50 | 011 | ALLOTTED |
| 2 | A — C<br>12:30   13:20 | 002 | ALLOTTED |
|   | C — A<br>13:40   14:30 | 112 | ALLOTTED |
| 3 | A — C<br>13:00   13:50 | 103 | UNALLOTTED |
|   | ⋮ | ⋮ | ⋮ |

FIG. 10
(a) NEW CREW ROSTER DIAGRAM IN THE MIDDLE OF PRODUCTION (COPY OF OLD CREW ROSTER DIAGRAM) AND NEW ROLLING STOCK OPERATION DIAGRAM
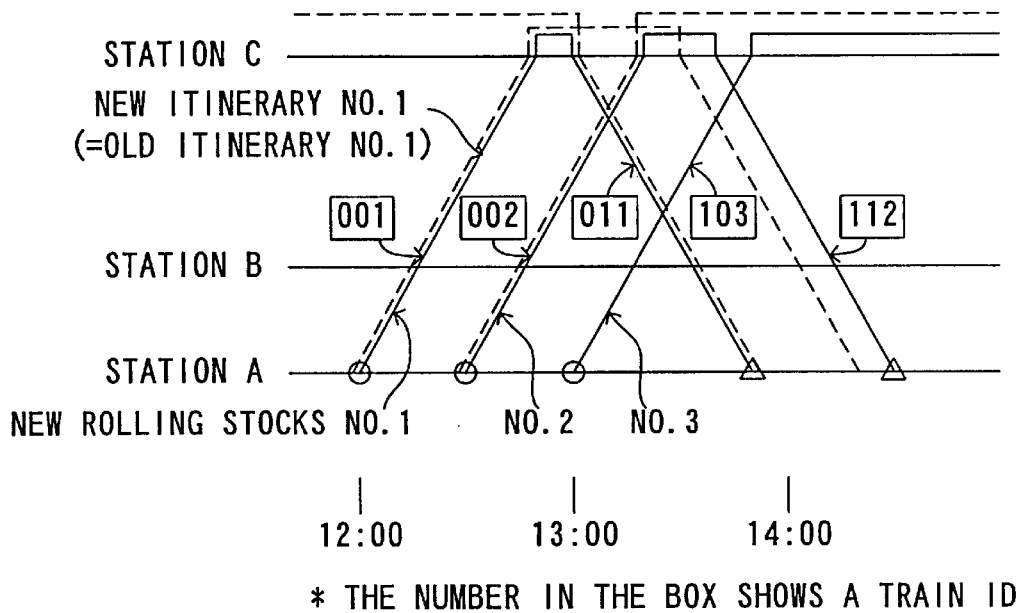
* THE NUMBER IN THE BOX SHOWS A TRAIN ID
(b) NEW CREW ROSTER DIAGRAM IN THE MIDDLE OF PRODUCTION (AFTER MATCHING) AND NEW ROLLING STOCK OPERATION DIAGRAM
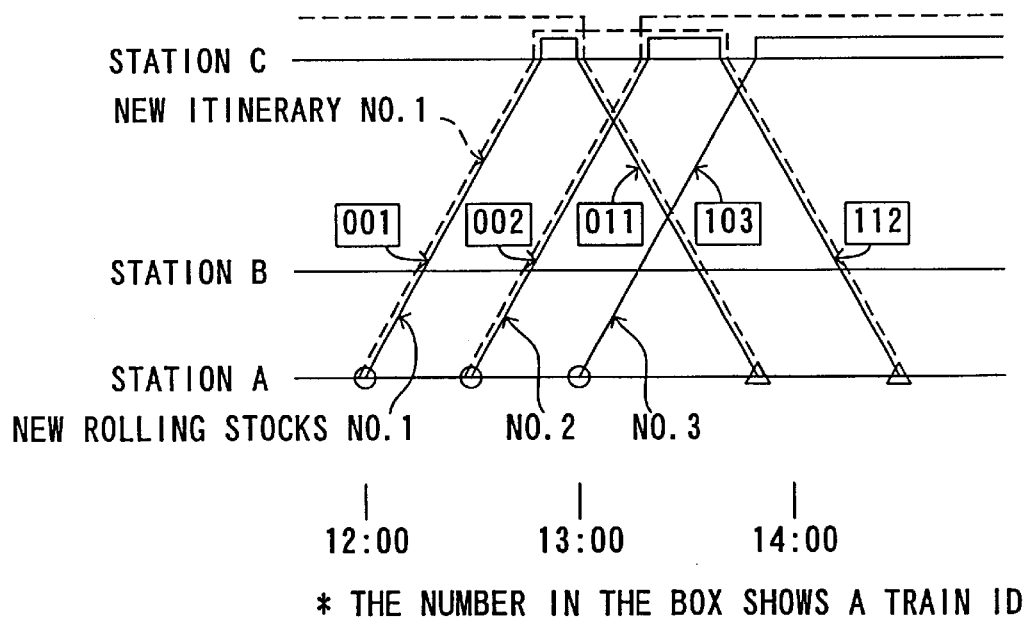
* THE NUMBER IN THE BOX SHOWS A TRAIN ID

US 6,249,741 B1

APPARATUS FOR SUPPORTING THE PREPARATION OF TRAVEL ROUTES

TECHNICAL FIELD

The invention is related to a machine for assisting crew itinerary production which assists newly producing itineraries that a crew follows from the departure at a train district to which the crew belongs to the arrival at the original train district, when a train diagram alteration (for example, in case of a diagram renovation or when a holiday diagram is produced based on a weekday diagram) is carried out.

BACKGROUND ART

For traffic and transport companies like railway, bus, airline and transport companies, it is necessary for the companies to decide exactly how to use crews who are to be on duty on vehicles. In case of a railway, for example, a prescription prescribing, which driver should drive which train, or a certain driver should next drive which train after he has driven some train and arrived at a terminal is called a crew roster. When producing such a crew roster, it should be considered that crews of a limited number fully but not excessively work, keeping to fixed working regulations, with the consideration of rolling stocks, railway districts and the like which the driver can drive, corresponding to a fixed train diagram.

The production work of crew rosters can be roughly divided into following two works:

The first work is to produce a crew itinerary by combining several of multiple train diagrams. The "crew itinerary", usually called simply "itinerary", is a path which a crew follows from departure at his train district to arrival at the same district (occasionally, after lodging). The first work will be described sequentially as follows: On the basis of a train diagram which determines that some train departs from some station at a certain time and arrives at some station at a certain time, a rolling stock operation diagram is produced which determines which rolling stocks should be allotted to the train diagram. The rolling stock operation diagram is fragmented at, for example, change stations where the crew changes the train, to produce many itinerary units (also called roster lines). These itinerary units are combined to make an itinerary. A diagrammatized itinerary is a crew roster diagram.

The second work is to produce a group duty schedule at a designated train district, based on the multiple itineraries thus produced. This procedure is called the group duty schedule production work or group schedule production work. The group schedule is a schedule which is produced by combining all duty schedules for crews of one group in one working unit, while several crew members are united to one group. Therefore, a crew belonging to the same group works according to the schedule, shifting it by one day work. A group schedule is produced by properly combining multiple itineraries. When producing it, it is considered that conditions such as labor hours, number of overnight shift, meal time and the like become equal for each crew and the working regulations are not violated. When a case occurs where such conditions do not become equal or the working regulations are violated, the first work is carried out again and the second work is redone after itineraries are replaced.

Since such crew roster production works were all done manually, much time and labor were needed. Therefore, machines for assisting the production works have been developed. Among them, as a machine for assisting the first work, for example, Japan Patent Laid-open Hei 5-298593 is known. According to the publication, diagram fragments produced from data of a rolling stock operation diagram are combined to form a group that is a higher element, considering, for example, stations where crews can be changed or the like as the restrictive conditions. The groups are combined to produce crew itineraries. Since crew rosters are produced by combining groups that are higher elements, the total number of combination in the production of crew itineraries is decreased compared with a case where each diagram fragment is combined and therefore, the load on the operator is decreased.

However, according to a machine shown in Japan Patent Laid-open Hei 5-298593, since the crew itinerary production was carried out from quite a blank sheet, the total number of combination for producing the crew itineraries still became so huge that the machine could not be used in practice, even if several diagram fragments produced from data of a rolling stock operation diagram were combined to form a group and such groups were combined to produce crew itineraries.

The invention is presented in respect of the aforementioned problem and the purpose of the invention is to provide a machine for assisting crew itinerary production which makes it possible to efficiently produce practical crew itineraries within a short period of time, with a decrease of the operator's burden.

DISCLOSURE OF THE INVENTION

According to the first aspect of the invention, a machine is provided for assisting crew itinerary production which assists newly producing itinerary data for an itinerary which a crew follows from departure at a train district to which the crew belongs to arrival at the original train district, by combining at plurality of boarding section data which indicate that when the crew boards on the train of what train line at what stations and when he gets off the train at what station afterward, wherein there are provided an old itinerary data storing means for storing old itinerary data, a new train-line storing means for storing a plurality of new train-lines, a new itinerary data storing means in the middle of production for storing new itinerary data in the middle of production, and a train-line allotting means which selects a new train-line which coincides with or lies within the allowable range of an old train-line corresponding to each boarding section data of the old itinerary data among the multiple new train lines, allots the selected new train-line in place of the old train-line corresponding to the boarding section data, and makes the new itinerary data storing means store the selected new train-line in the middle of production as new itinerary data in the middle of production.

In the explanation, "old" before a phrase or a word means that the phrase or the word is in the stage before the train diagram is altered, and "new" before a phrase or a word means that the phrase or the word is in the stage after the train diagram is altered. A "train-line" is train information about a train which is unconditionally determined by the departure station, the departure time, the arrival station and the arrival time. A "train district" is a traffic service district which administrates train operations. An "itinerary data" is made by combining multiple boarding section data. Usually, as shown in FIG. 11, an itinerary unit is produced by combining one or multiple boarding section data, and an itinerary or an itinerary data is completed by combining one or multiple itinerary units. The itinerary units and the itinerary are produced by considering labor hours, meal time, working regulations and so on. FIG. 12 is a graph showing a boarding schedule of a crew for a working day, which is an itinerary shown like a rod along time akis (abscissa).

As shown in the description about the background of the art, in the second work of crew roster production, group schedules are produced by properly combining multiple itineraries. Therefore, it is most important in performing the crew roster production work how to make itineraries or how efficiently the first work is performed.

A train-line allotting means of the invention selects a new train-line which coincides with or lies within the allowable range of an old train-line corresponding to each boarding section data of old itinerary data among multiple new train-lines, allots the selected new train-line in place of the old train-line corresponding to the boarding section data, and stores the selected new train-line in the new itinerary data storing means in the middle of production as new itinerary data in the middle of production. Among the new train-lines, there are train-lines which are quite the same to old train-lines (no alteration), or slightly deviate in departure/arrival times even if there are alterations in the train-lines. Therefore, in the invention, when new itineraries are produced, the crew itinerary production work is assisted by using the parts of data where old itineraries can be used without change, as they are.

Consequently, the operator of crew roster production work can produce itineraries far more efficiently compared with the case where itineraries are produced from new itinerary data on a so-called blank sheet, since he or she has only to perform the work by using new itinerary data in the middle of production obtained by a machine for assisting crew roster production work, or new itinerary data which are nearly completed. Heretofore, methods for producing new itineraries using linear analyses or AI functions are known. According to the methods, computers produce new itinerary data independently of old itinerary data. Therefore, even when the train diagram renovation itself is a partial one, the new itineraries are largely changed from the old itineraries. As a result, there occurs a big difference in crew rosters between before and after the train diagram alteration, causing such a problem that it takes a long time before the crews are used to the new boarding schedules. Such methods were not practical. The machine of the invention exhibit a great power especially in such a partial diagram renovation. Since the difference occurring in the crew rosters between before and after the train diagram alteration can be made very small, it suits practical use.

A machine of the second aspect of the invention is a machine of the first aspect of the invention, wherein there is further provided a new rolling stock operation data storing means which stores new rolling stock operation data that determine how to operate certain rolling stocks corresponding to the new train-line, the train-line allotting means selects a new train-line which coincides with or lies within the allowable range of an old train-line corresponding to each boarding section data of the old itinerary data among the new train-lines corresponding to the new rolling stock operation data, allots the selected new train-line in place of the old train-line corresponding to the boarding section data, and makes the new itinerary data storing means store the selected new train-line in the middle of production as new itinerary data in the middle of production.

In this case, the train allotting means selects a new train-line which coincides with or lies within the allowable range of an old train-line corresponding to each boarding section data of the old itinerary data among the new train-lines corresponding to the new rolling stock operation data. Generally, when itineraries are made, as shown in the paragraph of the background art, many itinerary units are produced by fragmenting rolling stock operation diagrams or rolling stock operation data, for example, at stations where crews change trains, and itineraries are produced by combining the itinerary units. Therefore, in the invention, it is considered that new itinerary data may be preferably produced by comparing with new rolling stock operation data.

In the third aspect of the invention, the train allotting means in the second aspect of the invention is constituted in such a way that it selects a new train-line which coincides with or lies within the allowable range of an old train-line corresponding to each boarding section data of the old itinerary data among the new train-lines corresponding to the new rolling stock operation data, by performing a pattern-matching of train-lines in the new rolling stock operation diagram on which all of the new rolling stock operation data are shown as a diagram with train-lines in the old crew roster diagram on which all of the old itinerary data are shown as a diagram. In the case, for example, both diagrams of train-line may be compared by reading the old crew roster diagram and the new rolling stock operation diagram as graphic data with an optical reader like OCR.

In the fourth aspect of the invention, a machine for assisting crew itinerary production of the second or third aspect of the invention is provided with a classifying means which classifies new train-lines which have not been allotted by the train-line allotting means among new train-lines corresponding to the new rolling stock operation data into the unallotted group. Among new train-lines corresponding to new rolling stock operation data, for data which have not been allotted to boarding section data constituting new itinerary data in the middle of production, such works as to produce new itineraries and to join to old itineraries separately become necessary. In the case, since these data have been classified into an unallotted group, the works can be easily performed. In these works, for example, new train-lines in the unallotted group are fragmented at every changing station to produce itinerary units. After deciding the belonging district (a train district to which an itinerary belongs) for the itinerary units, each of the itinerary units is joined to produce itineraries by means of a known AI functions or the like.

According to the fifth aspect of the invention, in a machine for assisting crew itinerary production of any one of the first to the fourth aspects of the invention, the allowable range is a range where a departure station and an arrival station in a new itinerary coincide with or overlap the boarding section of a corresponding old itinerary, and the departure time at the departure station or the arrival time at the arrival station are within a predetermined allowable range of time. Since a train-line is determined by a departure station, a departure time, an arrival station and an arrival time, concerning an allowable range within which two train-lines are regarded to coincide, it is preferable that the conditions about the departure station and time and the arrival station and time are fulfilled. Concerning time, it is preferred that departure time is thought to be more important than arrival time. For example, when a departure station and an arrival station in a boarding section of a corresponding old itinerary are station B and station C, respectively, which are positioned between station A and station D, station A and station D overlap these departure/arrival stations. In such a case where overlapping occurs, the section between the departure station B and arrival station C can be allotted. Therefore, as mentioned above, when a departure station and an arrival station in a new itinerary overlap those in a old itinerary, it is determined that the conditions for an allowable range are fulfilled. The allowable time may be determined so that it can not be changed afterward, though it is preferred that the operator can occasionally determine it. The allowable time difference is not specially limited. It may be preferably determined, for example, in the range from 0.1 to 5 hours.

According to the sixth aspect of the invention, in a machine for assisting crew itinerary production of any one of the first to the fifth aspects of the invention, a train ID given to each train-line is used in place of the train-line. In the case, it is convenient when both old and new data are used as they are, without new rolling stock operation data and old itinerary data being read with OCR or the like as a form of diagram.

According to the seventh aspect of the invention, in a machine for assisting crew itinerary production of any one of the first to the sixth aspects of the invention, the train-line allotting means selects a new train-line closest to the old train-line, when multiple new train-lines exist which lie within the allowable range of the old train-line corresponding to each boarding section data of the old itinerary data. Here, "closest" means that, for example, the difference between both departure times or between both arrival times is the smallest. Nevertheless, if the allottable ratio of total new train-lines is higher when the second best train-line is selected than when the closest train-line is selected, the second closest, not the closest, train-line can be selected.

According to the eighth aspect of the invention, in a machine for assisting crew itinerary production of any one of the first to the seventh aspects of the invention, the train-line allotting means allots a new train-line after confirming that the departure time of the latter train at the departure station does not become earlier than the arrival time of the former train at the arrival station, for two time-sequentially arranged boarding section data. In the case, it is preferable that such contradiction does not occur that, for example, at a changing station, the time when a train arrives at the station becomes earlier than the time when the train departs at the station.

BRIEF DESCRIPTION OF THE DRAWING FIGURES

FIG. 1 is a block diagram showing a schematic constitution of a machine for assisting crew roster production of the invention.

FIG. 2(a) is a table of old train data and FIG. 2(b) is an old train diagram.

FIG. 3(a) is a table of old rolling stock operation data, FIG. 3(b) is a table of old crew roster data and FIG. 3(c) is an old rolling stock operation diagram and an old crew roster diagram.

FIG. 5(a) is a table of new train data and FIG. 5(b) is a new train diagram.

FIG. 6(a) is a table of new rolling stock operation data and FIG. 6(b) is a new rolling stock operation diagram.

FIG. 9 is an explanation chart showing new crew roster data in the middle of production and new rolling stock operation data classified into the allotted and unallotted groups.

FIG. 10 is an explanation chart showing a new crew roster diagram and a new rolling stock operation data, in the middle of production.

THE MOST PREFERRED EMBODIMENT FOR EMBODYING THE INVENTION

Figure 2:
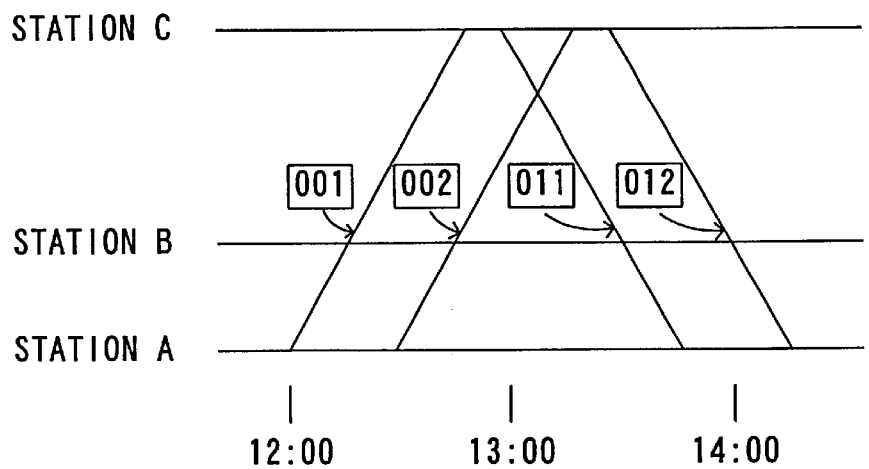
FIG. 2 are explanation charts for old train data.

A preferred embodiment of the invention will be described referring to drawing figures as follows:

FIG. 1 is a block diagram showing a schematic constitution of a machine for crew roster production. A machine for crew roster production 20 of the embodiment is a machine which is containing a concept of a machine for assisting crew itinerary production of the invention, and is provided with a CPU 30a, ROM 30b, RAM 30c, an input/output circuit 30d, a counter 30e, a known computer 30 which contains a bus 30f and the like connecting those units, and a mouse 32, a key board 34, a floppy disk drive (FDD) 36, external memory 38, CRT 40 and a printer 42 connected to the computer 30 via the input/output circuit 30d. The mouse 32 and the key board 34 are examples of input means, the FDD 36 and the external memory 38 are examples of storing means and CRT 40 is an example of displaying means.

The CPU 30a in the computer 30 executes various processings by temporarily storing data in the RAM 30b according to various control programs stored in the ROM 30b. The external memory 38 stores train data, rolling stock operation data, crew roster data, crew group schedule data and so on. In the embodiment, to every data before the train diagram renovation, "old" is added in front of the name of data, and to every data after train diagram renovation, "new" is added in front of the name of data.

Train data are the stored data where each train ID is made to correspond to its departure station and time and its arrival station and time. FIG. 2(a) is old train data shown as a table and FIG. 2(b) is the old train data shown as a diagram, or a train diagram. Here, a train ID is an ID given to each train-line (oblique lines in FIG. 2(b)). When the departure station and its departure time, and the arrival station and its arrival time are not altered, the same train ID is usually used after the train diagram renovation.

Rolling stock operation data are produced based on train IDs of train data and stipulate how certain rolling stocks should be operated. They shows an operation schedule for returning, sending back, cleaning, inspection and so on of the rolling stocks, like following example: For example, certain rolling stocks are made to correspond to a certain train ID, driven from station A to station B, then made to correspond to another train ID, driven from station B to station C, cleaned, made to correspond to another train ID and driven from station C to station D. FIG. 3(a) is a part of old rolling stock operation data shown as a table, and a solid line in FIG. 3(b) is the old rolling stock operation data shown as a diagram, or a rolling stock operation diagram. FIGS. 3 are produced based on FIGS. 2.

Crew roster data are produced based on train IDs of train data, and are itinerary data constituted by combining multiple boarding section data which show when crews board on which trains at what stations and when they get off the trains at what stations afterward. The itineraries are produced considering labor hours, meal time, working regulations and the like. FIG. 3(b) is a part of old crew roster data shown as a table. A dotted line in FIG. 3(c) is an old crew roster data shown as a diagram, or an old crew roster diagram. The relation between boarding section data, itinerary units and itineraries in FIGS. 3 is that each of boarding section data for two boarding sections (from station A to station C and from station C to station A) constitutes its itinerary unit and an itinerary (old itinerary No. 1) is constituted by combining these two itinerary units.

Figure 3:
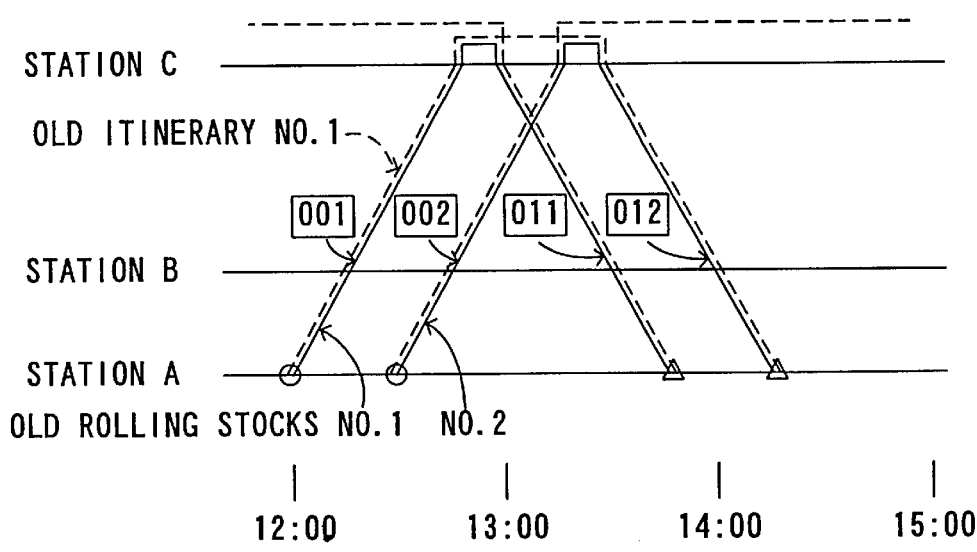
FIG. 3 are explanation charts for old rolling stock operation data and old crew roster data.
Figure 4:
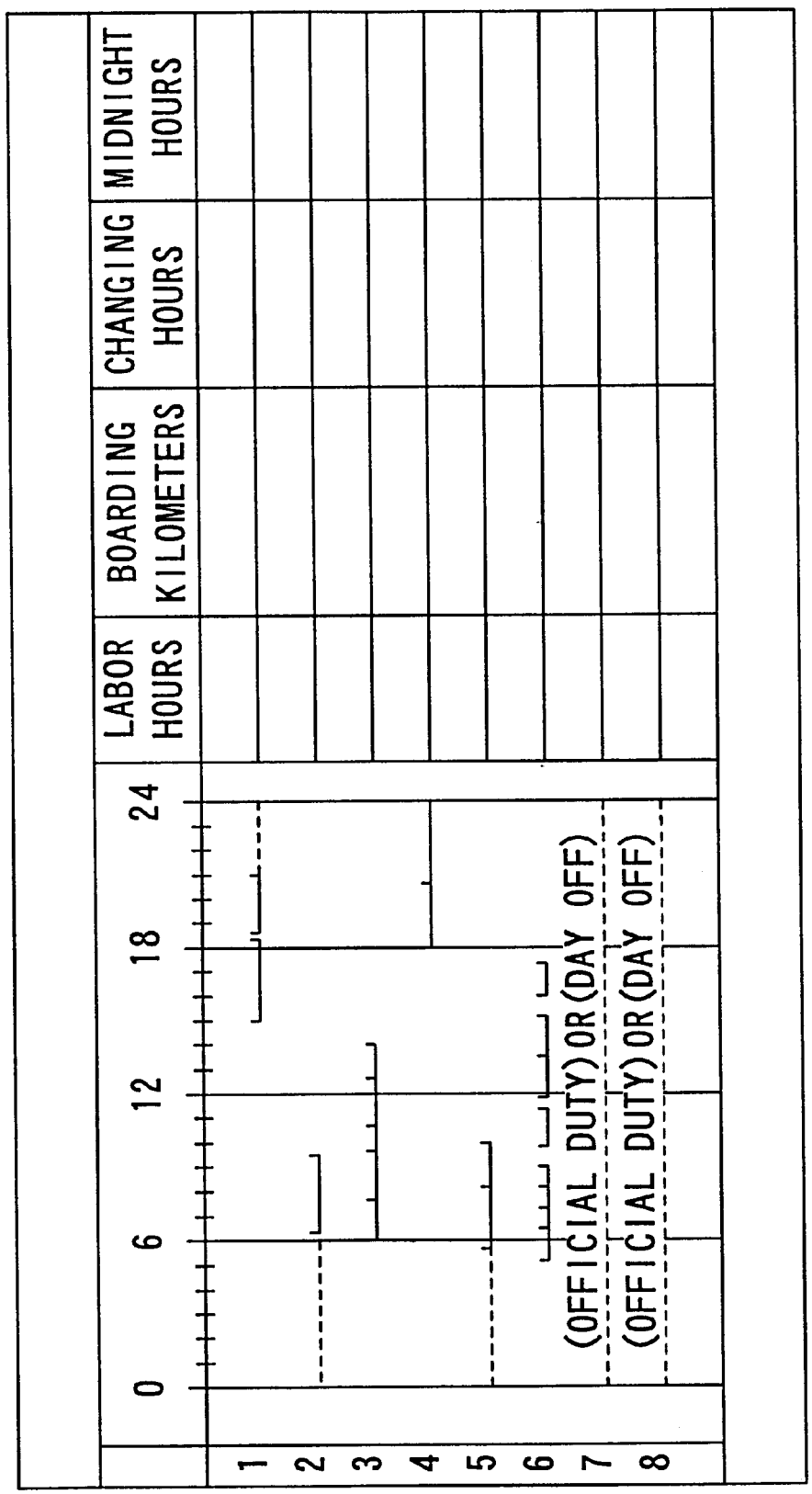
FIG. 4 is a table of group schedule data.
Figure 12:
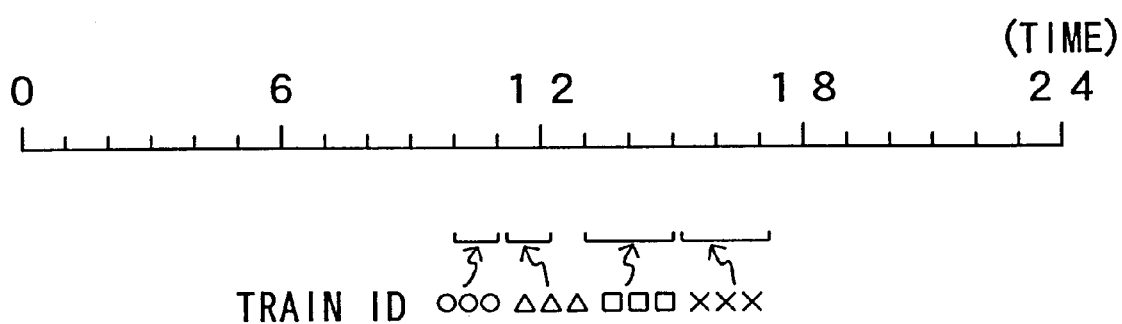
FIG. 12 is a boarding schedule of a crew for one working day.

Crew group schedule data are produced based on N itineraries (N is an integer), and are produced by combining all boarding schedules (refer to FIG. 12) for crews of one group in one working unit, while several crew members are united to one group (refer to FIG. 4). A crew belonging to the same group works according to each boarding schedule in the group schedule, shifting the work number numbered on the left side of the table of FIG. 4 one by one. The group schedule data are produced in such a way that conditions such as labor hours, number of overnight shift, meal time and the like become equal for each group and the working regulations are not violated. FIG. 4 was, made independently of FIGS. 2 and 3.

Each data can be displayed on the CRT 40 in the form of a graph or a diagram, printed on the printer 42 or made to be stored in the floppy disk via FDD 36 by the operator using the mouse 32 or the key board 34.

Subsequently, a procedure with which crew roster data are newly produced when a train diagram renovation is performed will be explained as follows: Old train data, old rolling stock operation data, old crew roster data, old crew group schedule data, new train data and new rolling stock operation data are stored in the external memory 38. New crew roster data and new crew schedule data are not stored in this stage, because these data are not produced yet.

Figure 5:
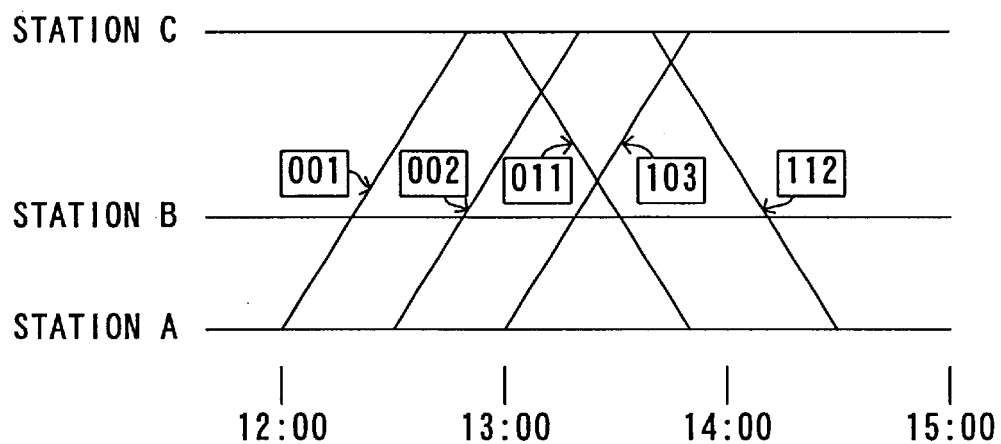
FIG. 5 are explanation charts for new train data.

For new train data, as well as for old train data, departure stations and times, arrival stations and times and train numbers are stored corresponding to train IDs. Some train IDs in new train data coincide with old train IDs in old train data but some do not. The case where both data do not coincide occurs in such an occasion where service of some train is suspended after the train diagram innovation (in the case, the old train ID is eliminated) or some train is additionally served after the train diagram renovation (in the case, the new train ID is added). FIG. 5(a) is new train data shown as a table and FIG. 5(b) is a new train diagram. As known from the comparison of FIG. 2 and FIG. 5, an old train ID "012" has been eliminated and a new train IDs "103" and "112" are added. Though not shown, there are cases where departure times or arrival times largely deviate in spite that train IDs coincide between new train data and old train data.

Figure 6:
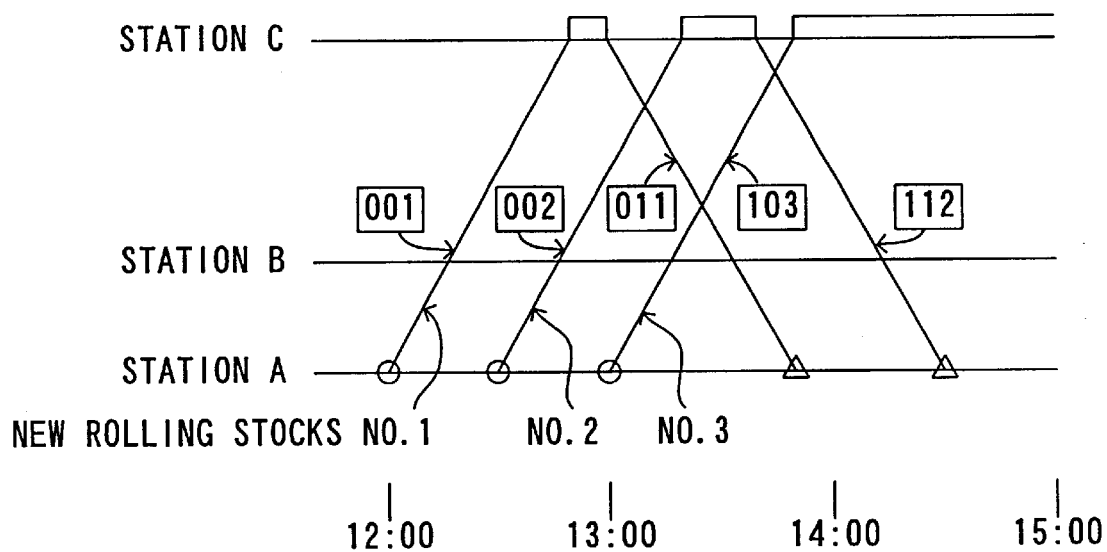
FIG. 6 are explanation charts for new rolling stock operation data.

New rolling stock operation data, as well as old ones, are produced based on train IDs of new train data. FIG. 6(a) is a part of new train data shown as a table and FIG. 6(b) is a new rolling stock operation diagram. FIG. 6 are produced based on FIG. 5.

New crew roster data and new crew group schedule data are generally produced as follows: At first, by performing a pattern matching between old crew roster data and new rolling stock operation data, portions of data which can be used as new crew roster data, as they are, are searched among old crew roster data. The portions of data are used as they are as new crew roster data. Then, portions of data which have not been used as new crew roster data among new rolling stock operation data are divided, for example, at each changing station. For each divided data, its belonging district is determined by the operator and depending on each belonging district, each data is combined by the computer to produce itinerary units. Itineraries are completed from thus produced itinerary units, by carrying out the itinerary production work with the aid of AI functions of the computer. New crew roster data are thus produced. Subsequently, new crew schedule data are produced by the computer, considering labor hours, working regulations and so on.

New crew roster data and new crew schedule data are generally produced as follows: At first, by performing a pattern matching between old crew roster data and new rolling stock operation data, portions of data which can be used as new crew roster data, as they are, are searched among old crew roster data. The portions of data are used as they are, as new crew roster data. As a result, some of itinerary units (obliquely drawn lines or line segments in rolling stock operation diagrams) having been used for old crew roster data among itinerary units in new rolling stock data are allotted to the same positions in new crew roster data, as they are, and several itineraries or itinerary units are produced. Then, portions of data which have not been allotted to new crew roster data among itinerary units of new rolling stock operation data are divided, for example, at each changing station. For each divided data, its belonging district is determined by the operator and depending on each belonging district, each data is combined by the computer to produce itinerary units. Itineraries are completed from thus produced itinerary units, by carrying out the itinerary production work with the aid of AI functions of the computer. New crew roster data are thus produced. Subsequently, new crew schedule data are produced by the computer based on thus completed itineraries, considering labor hours, working regulations and so on.

Figure 7:
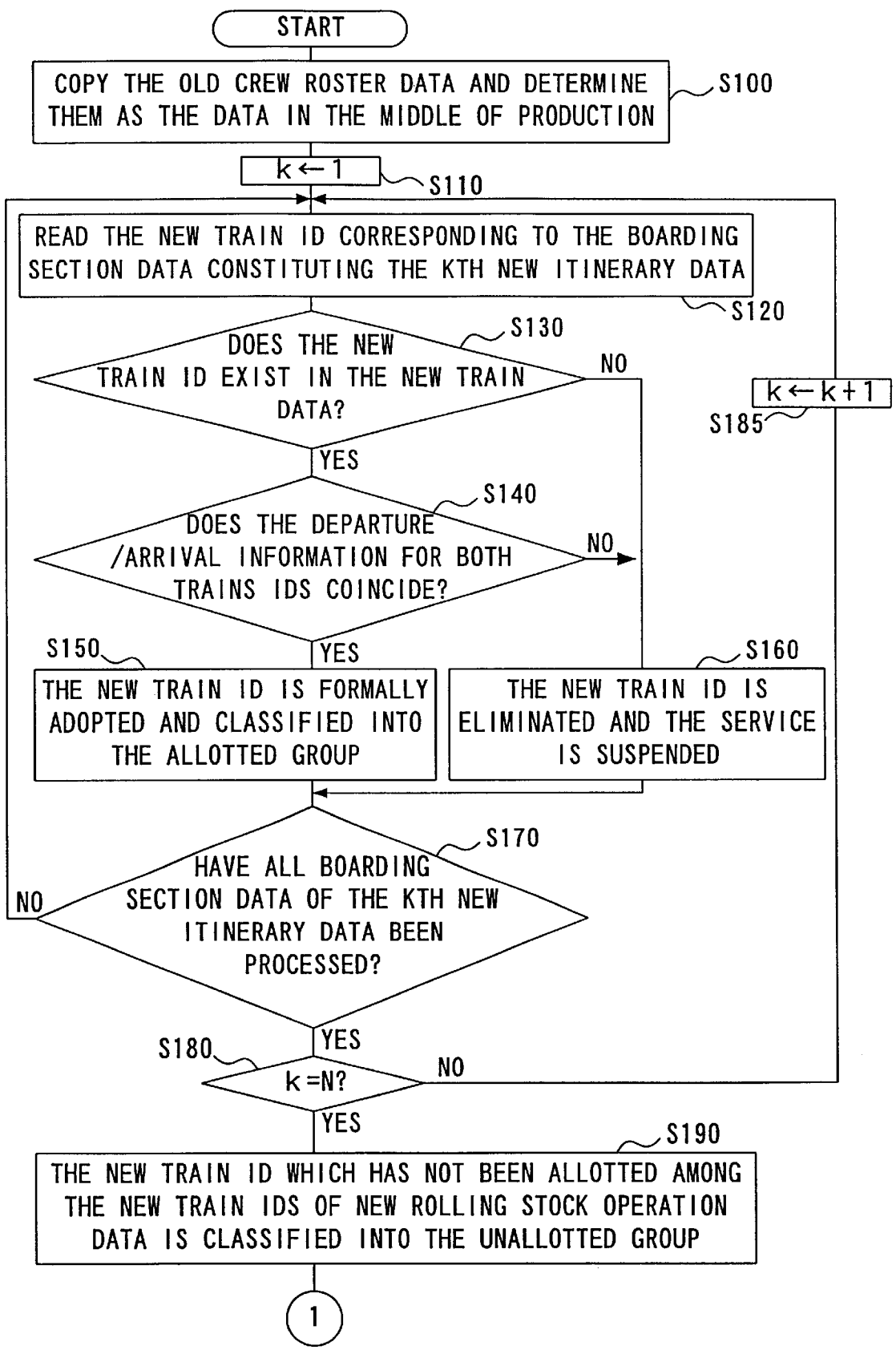
FIG. 7 is a flow chart showing processings of a program for assisting itinerary production (former half).
Figure 8:
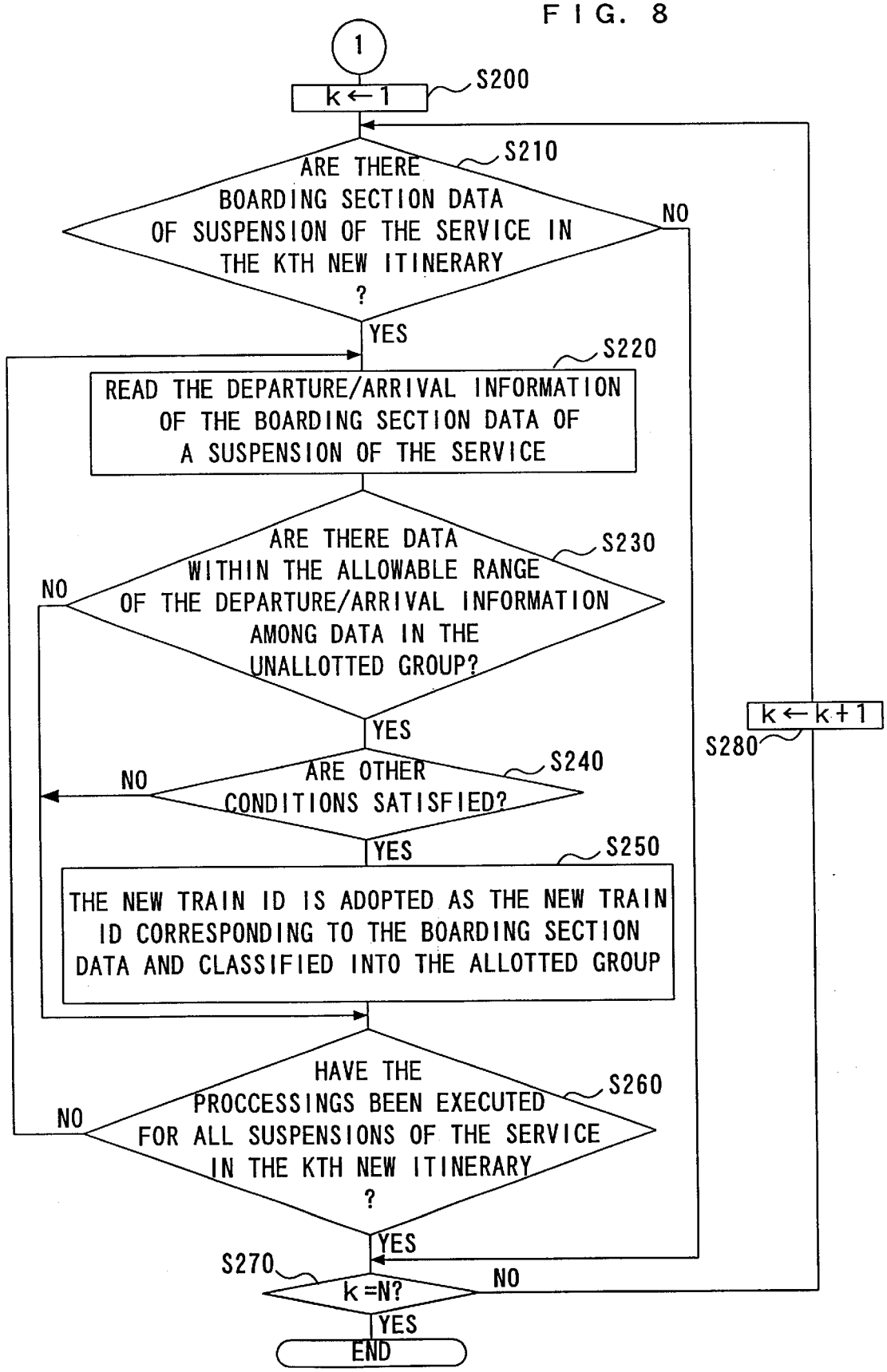
FIG. 8 is a flow chart showing processings of a program for assisting itinerary production (latter half).
Figure 11:
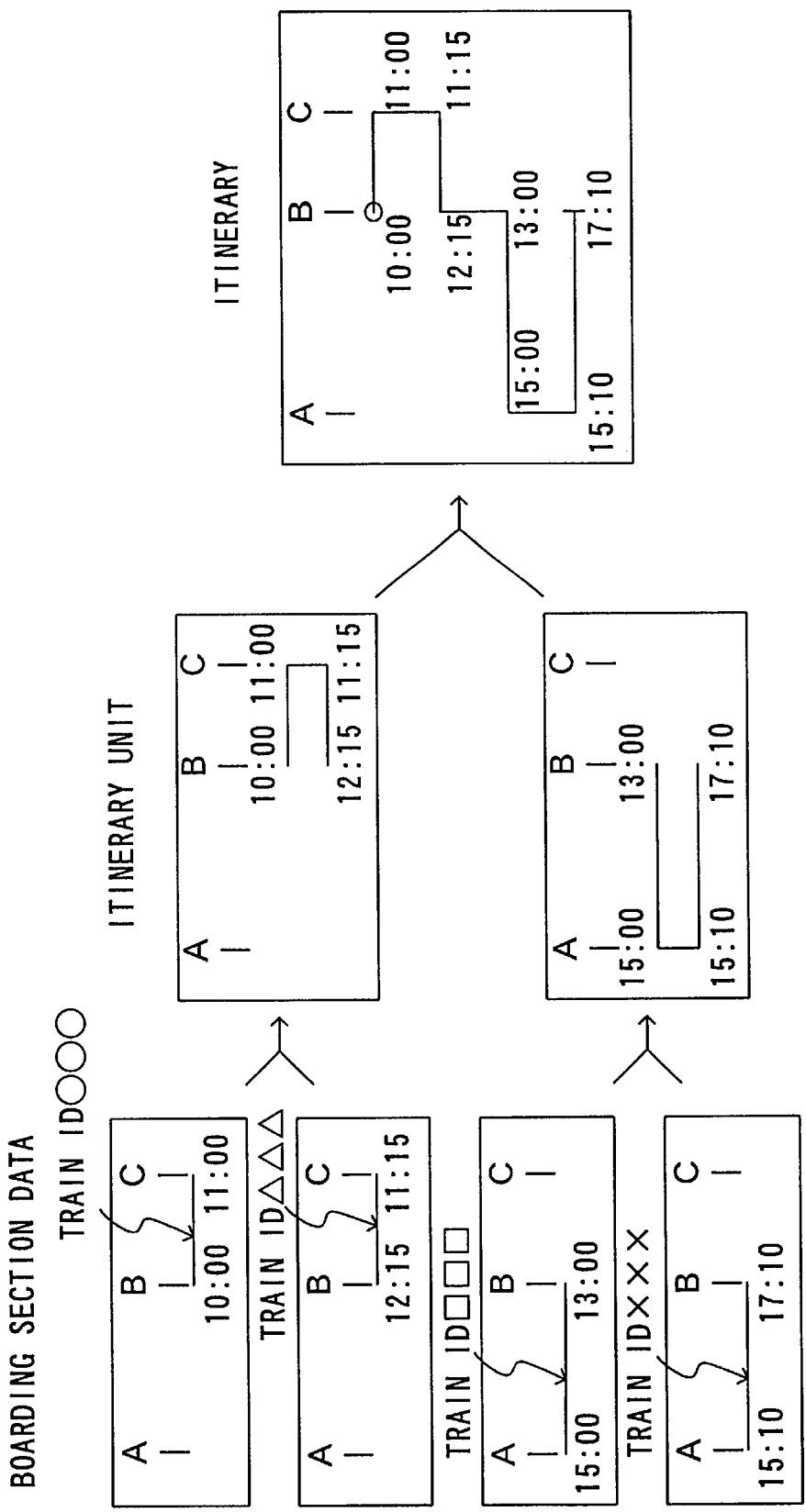
FIG. 11 is an explanation chart showing relations between boarding section data, itinerary units and an itinerary.

In the following, the production of new crew roster data will be described in detail, using FIGS. 7 and 8, which are flow charts of the processings for assisting production of itineraries, or the processings for pattern matching. When the operator commands the crew roster production from the mouse 32 or the key board 34 and then the itinerary production, at Step (called S, hereafter) 100, the CPU 30a in the computer 30 reads old crew roster data, which are a set of N old itinerary data, from the external memory 38 and copies the data, which are defined as the new crew roster data in the middle of production. Specifically, at this point, the new crew roster data in the middle of production are the data copied from old itinerary data, as they are, as new itinerary data. Also, the old train ID is copied as it is, as a new train ID corresponding to a boarding section in each new itinerary data.

At subsequent S110, 1 is set as a count value k on the counter 30e. At S120, for the aforementioned crew roster data in the middle of production, the new train ID is read which corresponds to the boarding section data constituting the kth new itinerary data. At subsequent S130, though an old train ID is tentatively allotted to the read new train ID, it is judged whether the new train ID exists as the train IDs of new train data (here, new train IDs corresponding to new rolling stock operation data) stored in the external memory 38, or not.

When the determination at S130 is affirmative, it is determined at S140 whether the departure stations and times, and arrival stations and times (called "departure/arrival information", hereinafter) coincide for both train IDs, or not. Usually, when both train IDs coincide, the departure/arrival information also coincides, but in some cases, they do not coincide due to certain reasons. Therefore, confirmation about the coincidence of the information is made at S140. When the determination at S140 is negative, the processing is passed to S160 mentioned hereinafter. On the other hand, when the determination at S140 is positive, at S150, the old train ID which has been allotted tentatively as the new train ID corresponding to the boarding section data is formally adopted as it is, while the new train ID corresponding to the boarding section data is classified into the allotted group in a form corresponding to the new rolling stock operation data.

Specifically, at S100, an old train ID is tentatively allotted as the new train ID corresponding to the boarding section data of the new itinerary data in the middle of production. When there is a train ID which coincides with the old train ID among new train IDs corresponding to new rolling stock operation data (YES at S130), the coinciding new train ID (=the old train ID) is formally adopted as the new itinerary data in the middle of production after it is confirmed that the departure/arrival information coincides (YES at S140), while it is classified into the allotted group (S150).

On the other hand, if the determination at S130 is negative, since the read new train ID, or the old train ID which has been tentatively allotted, has been eliminated or altered by the diagram renovation, at S160, the new train ID corresponding to the boarding section data is eliminated, while a suspension of the service is made to correspond to the boarding section data. Here, a suspension of the service means-that no train ID is allotted to the boarding section.

Subsequently, at S170, it is determined whether the processings from S120 to S160 have been executed for all boarding section data constituting the kth new itinerary data, or not. When there remain any unprocessed boarding section data, the processings from S120 are carried out again for the boarding section data. After the processings are finished for all data, next S180 processing is executed.

At S180, it is determined whether the count number k on the counter 30e coincides with the total number N of the new itinerary data. When the determination at S180 is negative, which means that there remain new itinerary data for which the processings from 120 have not been executed, the count number k is increased to k+1 at S185 and the processings from S120 are repeated. When the determination at S180 is affirmative, since the processings from S120 have been executed for all new itinerary data, at S190, the train ID which has not been allotted as the new train ID corresponding to the boarding section data of the new crew roster data in the middle of production among the new train IDs corresponding to the new rolling stock operation data is classified into the unallotted group.

An embodiment of the processings from aforementioned S100 to S190 will be explained as follows, using an example how the old rolling stock operation data and the old crew roster data in FIG. 3 are altered when the old train data in FIG. 2 are altered to the new train data in FIGS. 5. First, as shown in FIG. 9(a), the old crew roster data are copied, as they are, as the new crew roster data in the middle of production. Then, among the new train IDs corresponding to each boarding section data constituting the first new itinerary data, "001" exists as the new train ID corresponding to the new rolling stock operation data and the departure/arrival information coincides. Therefore, this is adopted as the new train ID corresponding to the boarding section data, as it is, while the new train ID is classified into the allotted group in a form corresponding to the new rolling stock operation data. Contrary to the case, another new train ID, "012", does not exist as the new train ID corresponding to the new rolling stock operation data. Therefore, the ID is eliminated and a suspension of the service is made to correspond to the boarding section data. After the same processings are executed for all new itinerary data from the second to the last, the data which have not been allotted as the new train IDs of the new crew roster data in the middle of production among the new train IDs corresponding to the new rolling stock operation data are classified into the unallotted group. As a result, as shown in FIG. 9(b), the new crew roster data in the middle of production and the new rolling stock operation data which are classified into the allotted group and the unallotted group are obtained. Since the new train IDs "112" and "103" in the new rolling stock operation data of FIG. 9(b) did not exist in the old train IDs, these are both classified into the unallotted group in this stage. FIG. 10(a) shows these data as a diagram.

In the following, the processings from S200 will be explained according to the flow chart in FIG. 8. At S200, following to S190, by the CPU 30a, the count number k of the counter 30e is set to 1 and at the following S210, it is determined whether there are boarding sections of suspension of the service (suspending-service boarding sections) for the kth new itinerary data of the new crew roster data in the middle of production which have been processed to S190.

When the determination at S210 is negative, the processing is passed to S270. Contrary, when the determination at S210 is affirmative, the processing is passed to S220. At S220, the departure/arrival information corresponding to the suspending-service boarding section data is read. At S230, it is determined whether there are data which lie within the allowable range of the departure/arrival information read at S220 in the group classified into the "unallotted" among the new train IDs of the new rolling stock operation data, or not. Here, the "allowable range" means that when compared with, for example, the departure/arrival information corresponding to the suspending-service boarding section data, the departure/arrival stations are the same and the departure time at the departure station is within the allowable range of time which is decided as a range of a predetermined allowable period of time. The allowable period of time can be determined freely to an optional value or within a predetermined range (for example, 0.1–5 hours). Other than a case where departure/arrival stations are the same, departure/arrival stations may be included. It is the case where, for example, when the departure/arrival stations of a suspending-service boarding section are station Q and station R, respectively, the departure/arrival stations of an unallotted new train ID are station P and station S, respectively and station Q and station R are situated between station P and station R. In the case, the driving section of the new rolling stock operation data is divided into sections, P-Q, Q-R and R-S from the section P-S, and each divided section becomes each itinerary unit.

When the determination at S230 is affirmative, it is determined whether other conditions are satisfied at S240. Other conditions are, for example, that time reversals and day discrepancies do not occur, and so on. Here, "time reversal" means that when an arrival time at a station where a crew changes a train, or a finishing time of a boarding, and a departure time at the station, or a starting time of a boarding, are compared, the starting time of the boarding becomes earlier than the finishing time of the boarding. A "day discrepancy" means that the departure time becomes yesterday or tomorrow. When the determination at S240 is affirmative, at S250, the unallotted train ID is adopted as the new train ID corresponding to the boarding section data and classified into the allotted group. The processing is passed to S260. When there are multiple data which are determined to be affirmative at S230 and S240 among the new train IDs corresponding to the new rolling stock operation data, the closest data to the departure/arrival information may be selected. But, if the allotting ratio becomes higher as the total when the second closest train-line is selected than when the closest train-line is selected, the second closest train-line may be selected. On the other hand, when the determination at S230 or S240 is negative, the boarding section data is kept as a suspension of the service, as it is, and the process is passed to S260 at once.

At S260, it is determined whether all the data for the boarding sections whose services are suspended among the kth new itinerary data have been processed, or not. When there are any unprocessed data, the process is returned to S220, the departure/arrival information for the other boarding sections whose services are suspended are read and the processings from S230 are executed. Contrary, when there is no remaining data at S260, the process is passed to S270 and it is determined whether the count number k coincides with the total number N of the new itinerary data, or not. Unless the count number k coincides with N, the processing is passed to S280, the count number k is increased by 1 and the processings from S210 are executed. Contrary, when the count number k coincides with N, the processings for assisting itinerary production are finished, since all the processings from S210 have been executed for all the new itinerary data.

An embodiment of aforementioned processings of S200–S280 will be described referring to FIGS. 9 and 10, following to the aforementioned embodiment. First, as for the new crew roster data in the middle of production shown in FIG. 9(b), among the first itinerary data, the boarding section data, station A (12:00)–station C (12:50), is not a suspension of the service, since a new train ID "001" corresponds, but the boarding section, station C (13:30) –station A (14:20), is a suspension of the service. Therefore, the departure/arrival information about the latter boarding section data, that is, the information that the boarding is started at station C at 13:30 and finished at station A at 14:20, is read. Among the data which are classified into the unallotted group in the new train IDs corresponding to the new rolling stock operation data, data which lie in the allowable range of the departure/arrival information (here, the departure/arrival stations are the same and the departure time is in the range of ±0.5 hour) are searched. The new train ID, "112", corresponding to the new rolling stock No. 2 conforms to this. Since the new train ID, "112", satisfies other conditions (here, the time reversal or the day discrepancy does not occur), the new train ID, "112", is adopted as a new train ID corresponding to the data for the boarding section whose service is suspended among the first new itinerary data, while the new train ID is classified into the allotted group. As a result, as shown in FIG. 9(c), the new crew roster data in the middle of production and the new rolling stock operation data which are classified into the allotted and unallotted groups are obtained.

In the new crew roster data in the middle of production in FIG. 9(c), the boarding starting time and the boarding finishing time in the boarding section data of from station C to station A have been replaced by 13:40 and 14:30, respectively, corresponding to the new train ID, "112". In the new rolling stock operation data in FIG. 9(c), the new train ID, "103", is out of the allowable range of the departure/arrival information of the boarding section data of the suspension of the service, or does not satisfy other conditions though it is in the allowable range, and is classified into the unallotted group in this stage. FIG. 10(b) shows these data as a diagram.

In the example, after the "suspension of the service" is once made to correspond to the boarding section data of from station C to station A, a new train ID is allotted here and the new itinerary data are completed. But, when there are no data within the allowable range of the departure/arrival information for the "suspension of the service" among the new train IDs corresponding to the new rolling stock operation data, the "suspension of the service" is kept, even after the processings for assisting the itinerary production have been executed. The new itinerary data which include such a "suspension of the service" are dealt with as itinerary units or the boarding section data might be eliminated by the operator.

After the processings for assisting itinerary production are over, there are some data which have been classified into the unallotted group among new train IDs corresponding to new rolling stock operation data. For instance, like the new train ID, "103", corresponding to the new rolling stock No. 3 in the new rolling stock operation data in FIG. 9(c), a new train ID which is newly supplemented due to the train diagram alteration, and the like belong to such the unallotted group. For the new train ID classified into such the unallotted group, at first, the driving section is divided into one or multiple boarding sections using the mouse 32 or the key board 34 by the operator, and each belonging district is determined. A belonging district means a district which administrates the boarding work related to the drive of certain trains. Imagine that the driving section of, for example, the train ID, "123", is from station A to station C via station B. When the boarding section from station A to station B in the driving section is made to be administrated by district T, the belonging district of the boarding section from station A to station B of the train ID, "123", is determined to be district T.

Subsequently, the CPU 30a of the computer 30 produces itinerary units by combining boarding section data for each belonging district, considering the predetermined conditions such that it is efficient when, for example, a crew who has finished a boarding on a certain train at station E starts the next boarding duty at station E, or an appropriate train for the transfer (available train) is necessary when he starts the next boarding duty at another station.

Thereafter, the operator inputs various fixing conditions such as total number of itineraries, number of lodging itineraries (itineraries including lodgings), time zone of work start in the itinerary after a lodging, meal time and so on, and subsequently commands the automatic itinerary production. Then, the CPU 30a connects itinerary units to form itineraries by deduction and induction, judging the judging conditions based on the AI functions, and finally produces itineraries which satisfy all the judging conditions. A new crew roster data are obtained as a result. As a judging condition, there is, for example, the condition related to labor hours of continuous work in one working day. Other than this, the restriction of one continuous boarding hours, the restriction of one continuous boarding kilometers and the restriction of preceding hours which are thought to be necessary before starting the next boarding duty at the arrival station may be taken up as the judging conditions.

Hereinafter, a procedure for producing new crew roster data for each day of the week will be described. At first, new crew roster data for weekdays (from Monday to Thursday) are produced according to the aforementioned procedure Specifically, new rolling stock operation data for weekdays and old crew roster data for weekdays are used to execute the processings for assisting itinerary production by the computer. Then, itinerary units are produced by the operator for the unallotted group of new rolling stock operation data for weekdays. Thereafter, the automatic itinerary production by the computer is carried out. In the automatic itinerary production, new crew roster data are completed after lodging itineraries are produced by connecting midnight itinerary units and dawn itinerary units of new crew roster data in the middle of production for a weekday.

Subsequently, new crew roster data for Saturday are produced. At first, the processings for assisting itinerary production are executed by the computer using new rolling stock operation data for Saturday and previously produced new crew roster data for weekdays. Then, itinerary units are produced by the operator for the unallotted group of new rolling stock operation data for Saturday. Thereafter, the automatic itinerary production by the computer is carried out. Though old crew roster data for Saturday may be used in place of new crew roster data for weekdays, the latter are more preferably used, since data of the unallotted group becomes less in the case. In the automatic itinerary production, lodging itineraries are produced by connecting midnight itinerary units and dawn itinerary units of new crew roster data for Saturday in the middle of production, and new crew roster data are completed.

Subsequently, new crew roster data for Friday and Sunday are produced. In the case, by using already produced new crew roster data for weekdays and Saturday, new crew roster data for Friday and Sunday are obtained at once, without executing the processings for assisting itinerary production or the like. Specifically, new crew roster data for Friday are obtained by reconnecting midnight itinerary units of new crew roster data for weekdays with dawn itinerary units of new crew roster data for Saturday, and new crew roster data for Sunday are obtained by reconnecting midnight itinerary units of new crew roster data for Saturday with dawn itinerary units of new crew roster data for weekdays.

When the itineraries have been completed in such a way, the operator inputs, by using the mouse 32 or the key board 34, various fixing conditions such as the registration condition of itinerary sets obtained by combining itineraries (for example, only itineraries of a designated type of rolling stock can be combined, and so on), the equalizing condition (to equalize labor and restraint hours, meal time and the like) and used working restrictions, and subsequently commands the automatic group schedule production. Then, the CPU 30a computes the labor and restraint hours for all itineraries in the relevant districts and determines itineraries which can be combined according to the registration condition. One of the itineraries in the relevant districts is selected, the itinerary set containing the least itineraries among the registered itineraries is selected and the itinerary is registered to the itinerary set. Such a sequence of works for registering the itinerary to the itinerary set is repeated until no itineraries in the relevant districts remain. Thereafter, the data are collated with the equalizing condition and the working regulations. When a violation of the equalizing condition or of the working regulations is detected, the combination in the itinerary set is changed by carrying out aforementioned registration works. The changing works are repeated until all the violations are dissolved. There can happen such a case where some violations remain undissolved. In the case, the operator carries out the violation dissolving works with manual operation using the mouse 32 or the key board 34. The automatic group schedule production is described, for example, in the paragraph No. 0047 to 0069 of Japan Patent Leid-open Hei 7-262423 in detail.

As fully mentioned above, according to a machine 20 for crew roster production of the embodiment, the operator for the crew roster production works uses new crew roster data in the middle of production, or half-completed new crew roster data, to complete the crew roster data. Therefore, itineraries can be far more efficiently produced compared with a case where new crew roster data are produced on a "blank sheet of paper". Heretofore, methods for producing new crew roster data are known in which the linear analyses or the AI functions were used. But in the methods, since the computer produces new crew roster data independently of old itinerary data, the new crew roster data are altered quite from the old crew roster data, even when the diagram renovation itself is a partial one. As a result, there occur big differences between the crew rosters before and after the diagram alteration, and such problem happens that it takes long time before crews become used to the crew duty schedules. The methods could not be practical. The machine of the invention is especially powerful for such a partial renovation. Since the differences of, crew rosters before and after the train diagram alteration can be suppressed to a minimum, the machine is suitable for practical use.

Such works as separately to produce new itinerary units or itineraries, or to connect with old itinerary units or itineraries are necessary for the data which have not been allotted to boarding section data constituting new crew roster data in the middle of production among new train IDs corresponding to new rolling stock operation data. In the embodiment, since the new train IDs have been classified into the unallotted group, the works can be easily performed.

In the crew roster production machine 20 of the above-mentioned embodiment, the external memory 38 corresponds to the old itinerary data storing means, the new train-line storing means, the new rolling stock operation data storing means and the new itinerary data storing means in the middle of production, of the invention, and the CPU 30a of the computer 30 corresponds to the train-line allotting means and the classifying means of the invention. The processings from S100 to S280 in FIGS. 7 and 8 correspond to the processings of the train-line allotting means and the classifying means of the invention.

The invention is not limited to the aforementioned embodiment but various modifications can be embodied within the scope of the invention.

For instance, in the above-mentioned embodiment, crew rosters for the railway were shown as an example. Crew rosters for other means of transportation, such as buses, airlines, tracks and taxis, can be produced in the same way.

Moreover, when Saturday and holiday diagrams are produced from weekday diagrams, they can be produced in the same way as in the aforementioned embodiment, though an example of train diagram renovation was shown in the embodiment. Since the Saturday and holiday diagrams are nearly the same to the weekday diagrams, except that the services of the train in the commuter time zone is less in the Saturday and holiday diagrams than in the weekday diagrams, the machine for assisting crew roster production of the invention can be effectively used.

Also, new train IDs may be selected which coincide with or lie within the allowable range of old train IDs corresponding to each boarding section data of old itinerary data among new train IDs corresponding to new rolling stock operation data, by comparing train-lines in: old crew roster diagrams and new rolling stock operation diagrams after reading those diagrams with an optical reader like OCR as diagrammatic data.

Further, when new itinerary data are produced, though in the aforementioned embodiment, it was determined whether tentative new train IDs corresponding to each boarding section data of new itinerary data coincide with new train IDs corresponding to new rolling stock operation data, it may be also determined that the tentative new train IDs coincide with new train IDs of new train data, irrespective of new rolling stock operation data.

USABILITY FOR INDUSTRIES

As mentioned above, the machine for assisting crew itinerary production of the invention is suitable for exactly determining how to operate crews who are to be on duty on traffic and transport companies like railway, bus, airline and transport companies.

What is claimed is:

1. A machine for assisting crew itinerary production which assists newly producing itinerary data for an itinerary which a crew follows from the departure at a train district to which the crew belongs to the arrival at the original train district, by combining plurality of boarding section data which indicate that when the crew boards on the train of what train-line at what station and when the crew gets off the train at what station afterward, wherein there are provided an old itinerary data storing means for storing old itinerary data, a new train-line storing means for storing plurality of new train-lines, a new itinerary data storing means in the middle of production for storing new itinerary data in the middle of production, and a train-line allotting means which selects a new train-line which coincides with or lies within the allowable range of an old train-line corresponding to each boarding section data of said old itinerary data among said multiple new train lines, allots said selected new train-line in place of the old train-line corresponding to the boarding section data, and stores said selected new train-line in said new itinerary data storing means in the middle of production.

2. A machine for assisting crew itinerary production which assists newly producing itinerary data for an itinerary which a crew follows from the departure at a train district to which the crew belongs to the arrival at the original train district, by combining plurality of boarding section data which indicate that when the crew boards on the train of what train-line at what station and when the crew gets off the train at what station afterward, wherein there are provided an old itinerary data storing means for storing old itinerary data, a new train-line storing means for storing plurality of new train-lines, a new rolling stock operation data storing means which stores new rolling stock operation data that determine how to operate certain rolling stocks corresponding to said new train-line, a new itinerary data storing means in the middle of production for storing new itinerary data in the middle of production, and a train-line allotting means which selects a new train-line which coincides with or lies within the allowable range of an old train line corresponding to each boarding section data of said old itinerary data among said new train-line corresponding to said new rolling stock operation data, allots said selected new train-line in place of the old train-line corresponding to the boarding section data, and stores said new train-line in said new itinerary data storing means in the middle of production as the new itinerary data in the middle of production.

3. The machine for assisting crew itinerary production according to claim 2, wherein said train-line allotting means selects a new train-line which coincides with or lies within the allowable range of an old train-line corresponding to each boarding section data of said old itinerary data among said new train-lines corresponding to said new rolling stock operation data, by performing a pattern-matching of train-lines in the new rolling stock operation diagram on which all of said rolling stock operation data are shown as a diagram with train-lines in the old crew roster diagram on which all of said old itinerary data are shown as a diagram.

4. The machine for assisting crew itinerary production according to claim 2, wherein there is provided a classifying means which classifies new train-lines which have not been allotted by said train-line allotting means among new train-lines corresponding to said new rolling stock operation data into an unallotted group.

5. The machine for assisting crew itinerary production according to claim 1, wherein said allowable range is a range where a departure station and an arrival station in a new itinerary coincide with or overlap the boarding section of a corresponding old itinerary, and the departure time at the departure station or the arrival time at the arrival station are within a predetermined allowable range of time.

6. The machine for assisting crew itinerary production according to claim 1, wherein a train ID given to each train-line is used in plane of said train-line.

7. The machine for assisting crew itinerary production according to claim 1, wherein said train-line allotting means selects a new train-line closest to its old train-line, when multiple new train-lines exist which lie within the allowable range of the old train-line corresponding to each boarding section data of said old itinerary data.

8. The machine for assisting crew itinerary production according to claim 1, wherein said train-line allotting means allots a new train-line after confirming that the departure time of the latter train at the departure station does not become earlier than the arrival time of the former train at the arrival station, for two time-sequentially arranged boarding section data.

* * * * *